United States Patent
Bamford (10) Patent No.: US 10,464,101 B2
(45) Date of Patent: Nov. 5, 2019

(54) COATING APPARATUS AND METHOD

(71) Applicant: Automatic Coating Limited, Toronto (CA)

(72) Inventor: Brad Bamford, Scarborough (CA)

(73) Assignee: Automatic Coating Limited, Toronto (CA)

( * ) Notice: Subject to any disclaimer, the term of this patent is extended or adjusted under 35 U.S.C. 154(b) by 0 days.

(21) Appl. No.: 15/720,099

(22) Filed: Sep. 29, 2017

(65) Prior Publication Data

US 2018/0085781 A1    Mar. 29, 2018

Related U.S. Application Data

(63) Continuation of application No. 14/565,654, filed on Dec. 10, 2014, now Pat. No. 9,802,218, which is a continuation of application No. 13/744,256, filed on Jan. 17, 2013, now abandoned.

(60) Provisional application No. 61/587,605, filed on Jan. 17, 2012.

(51) Int. Cl.
| | | |
|---|---|---|
| *B05D 1/24* | (2006.01) | |
| *B05D 1/22* | (2006.01) | |
| *B05C 19/02* | (2006.01) | |
| *B05C 3/10* | (2006.01) | |
| *B65G 49/04* | (2006.01) | |
| *B65G 49/02* | (2006.01) | |

(52) U.S. Cl.
CPC .............. *B05D 1/24* (2013.01); *B05C 3/10* (2013.01); *B05C 19/02* (2013.01); *B05C 19/025* (2013.01); *B05D 1/22* (2013.01); *B65G 49/02* (2013.01); *B65G 49/04* (2013.01); *B65G 49/0413* (2013.01); *B65G 49/0431* (2013.01)

(58) Field of Classification Search
CPC ......... B05C 3/10; B05C 19/02; B05C 19/025; B05C 3/132; B65G 49/02; B65G 49/04; B65G 49/0431; Y10S 118/05; B05D 1/22; B05D 1/24
USPC .......................... 118/400, 423, 428, 303, 308
See application file for complete search history.

(56) References Cited

U.S. PATENT DOCUMENTS

| | | |
|---|---|---|
| 733,831 A | 7/1903 | First |
| 1,109,314 A | 9/1914 | Beausejour |
| 2,491,015 A * | 12/1949 | Poole ................ A61L 2/00 118/425 |
| 3,058,604 A | 10/1962 | Harper |
| 3,248,253 A | 4/1966 | Barford et al. |
| 3,262,420 A * | 7/1966 | Bossi .............. B05C 19/02 118/423 |
| 3,507,251 A | 4/1970 | Peterson |
| 3,861,352 A | 1/1975 | Hammer |
| 4,013,807 A | 3/1977 | Putney et al. |
| 4,397,893 A | 8/1983 | Bottoms |
| 4,609,093 A | 9/1986 | Taketani |

(Continued)

OTHER PUBLICATIONS

International Search Report Issued in PCT Application No. PCT/CA2018/050982; search completed Nov. 9, 2018.

*Primary Examiner* — Laura Edwards
(74) *Attorney, Agent, or Firm* — Blake, Cassels & Graydon LLP; John R. S. Orange; Brett J. Slaney (57) ABSTRACT

A component such as a door is coated by immersion in a fluidized bed. The component is supported by a hook assembly that moves the component within the fluidized bed during coating. The movement is cyclical and inhibits bridging of the coating material when applied to intricate articles.

19 Claims, 8 Drawing Sheets

(56) References Cited

U.S. PATENT DOCUMENTS

| | | |
|---|---|---|
| 4,930,213 A | 6/1990 | Hayakawa et al. |
| 5,137,689 A * | 8/1992 | Cantrell ............... A61C 19/002 422/28 |
| 5,203,811 A | 4/1993 | Hirotani |
| 5,231,726 A | 8/1993 | McKenney et al. |
| 6,280,798 B1 | 8/2001 | Ring et al. |
| 6,444,032 B1 | 9/2002 | Bamford |
| 9,802,218 B2 | 10/2017 | Bamford |
| 2010/0236896 A1 | 9/2010 | Miura et al. |
| 2015/0321218 A1 | 11/2015 | Bamford |

* cited by examiner

COATING APPARATUS AND METHOD

CROSS REFERENCE TO RELATED APPLICATIONS

This application is a Continuation of U.S. application Ser. No. 14/565,654 filed on Dec. 10, 2014 and issued as U.S. Pat. No. 9,802,218, which is a Continuation of U.S. application Ser. No. 13/744,256 filed on Jan. 17, 2013 (now abandoned), which claims priority from U.S. Provisional Application No. 61/587,605 filed on Jan. 17, 2012, the entire contents of which are incorporated herein by reference.

FIELD OF THE INVENTION

The present invention relates to a method and apparatus for applying a coating to a component.

SUMMARY OF THE INVENTION

Most fabricated articles require a coating to be applied to protect them against the environment in which they will operate. One of the most demanding environments is salt water, as encountered on seagoing vessels, in which mechanisms and components must be protected again the corrosive effects of the salt carried in the sea water. The maintenance of the components is an expensive and continuous process. Painting or coating of components is performed prior to exposure, but even then frequent replacement of intricate components where salt water may be trapped is necessary.

One particular application that has proven difficult to properly maintain is the sealing systems found on watertight doors used on seagoing vessels. The seals are contained within a channel formed from a lip of the door and a weldment to contain the seal. This construction provides various crevices in which protective coatings are difficult to apply and in which seawater tends to collect in use leading to rapid corrosion of the seal system and failure of the door.

It is known to apply coatings through the use of fluidized beds to components as shown for example in U.S. Pat. No. 6,444,032. The coating of a door assembly with a seal retention system does however pose further challenges, in particular because of the intricate nature of the seal retention system.

OBJECT OF THE INVENTION

It is therefore an object of the present invention to obviate or mitigate the disadvantages found in prior systems.

SUMMARY OF THE INVENTION

According to the present invention there is provided a method of applying a coating to a component which comprises steps of positioning said component adjacent to a fluidized bed, immersing the component into the fluidized bed to apply a coating thereto, moving the component within the fluidized bed during application of the coating, removing the component from the fluidized bed.

Embodiments of the invention will now be described by way of example only with reference to the accompanying drawings in which.

Figure 8:
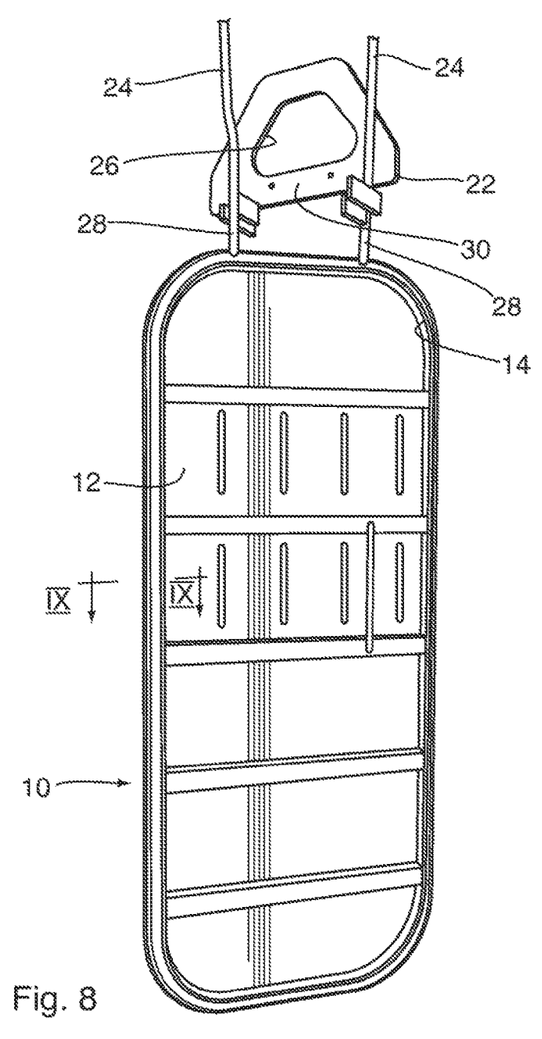
FIG. 8 is a perspective view of a component to be coated by the process of FIG. 1 or 7.
Figure 9:
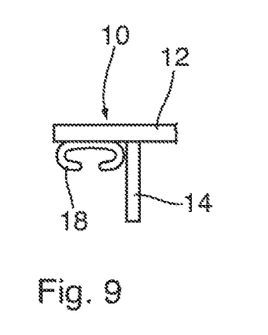
FIG. 9 is a section on the line IX-IX of FIG. 8.

Referring firstly to FIG. 8, a component 10 that is to be coated is in the form of a door having an outer surface 12, and a frame 14. On the frame 14 there is provided a seal retainer 18 that carries a seal assembly (not shown) and cooperates with a door frame. The seal retainer 18 is formed as a channel in which a seal sits and has an overturned lip and a flange welded to the frame 14 to define the channel. The channel is of convoluted configuration and is therefore difficult to coat in a manner that fills the voids between the retainer 18 and the frame 14. It will be appreciated that the door is merely exemplary of the components that may be coated and is itself of known construction.

Figure 1:
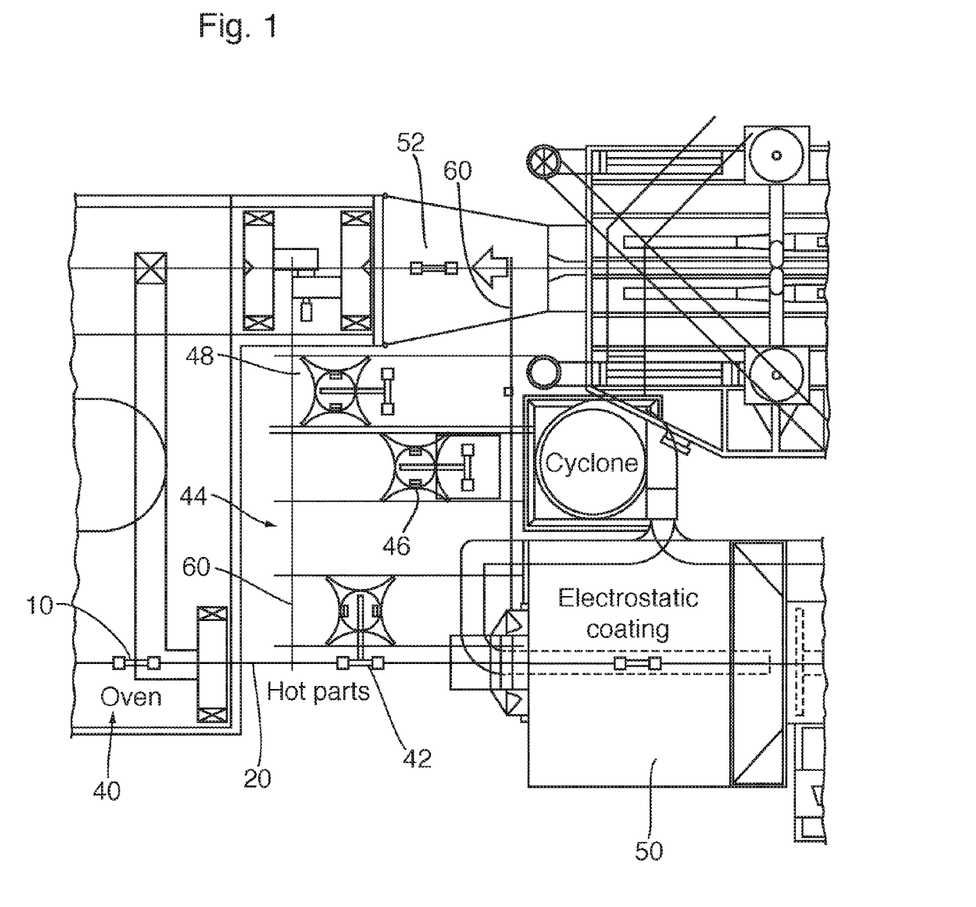
FIG. 1 is a schematic representation of a process flow for coating a component.

Referring to FIG. 1, a coating process for the component 10 is shown in which the component 10 is moved between different stations by an overhead primary conveyor indicated at 20. The primary conveyor 20 is a conventional chain conveyor with hangers that allow components to be suspended from the conveyor. The hanger is shown in FIG. 8 and has a body 22 with a pair of hooks 24 extending upwardly for engagement with the primary conveyor 20. The body 22 has central aperture 26 with a series of lower hooks 28 extending below a lower edge 30 of the body 22. The lower hooks 28 have upturned ends to engage a lip on the upper edge of the frame 14. The exact form of the hangers 22 will vary depending upon the nature of the component 10 but, as is standard practice, seek to minimise the footprint of the suspension system on the component 10.

Referring again to FIG. 1, the primary conveyor 20 moves the component 12 through an oven 40 to a transfer station 42. At the transfer station 42 the component 10 is transferred onto a secondary lateral conveyor 44, to be described in more detail below so that it may be transferred into alignment with a fluidized bed 46. The secondary lateral conveyor 44 positions the component within the fluidized bed for a predetermined time and then retracts the component and transfers it to an air blow off station 48. The purpose of the air blow off station 48 is to remove surplus coating deposited by the fluidized bed. The component 10 is then transferred by the secondary lateral conveyor 44 back to the primary conveyor 20 which moves the component through an electrostatic coating station 50. A further coating is applied at coating station 50 to that applied in the fluidized bed and the primary conveyor 20 carries the component through into a curing oven 52.

Figure 2:
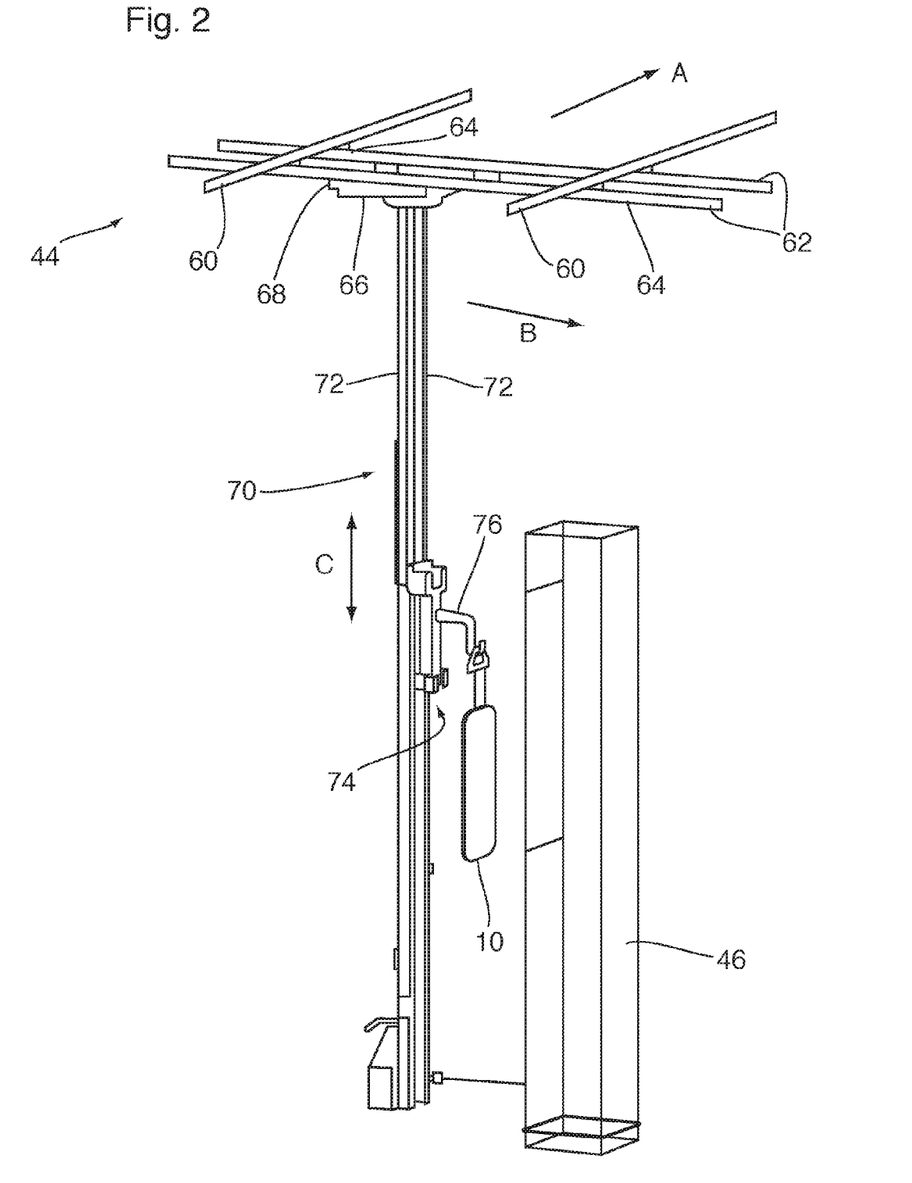
FIG. 2 is a perspective view of a transfer and coating apparatus shown in FIG. 1.
Figure 3:
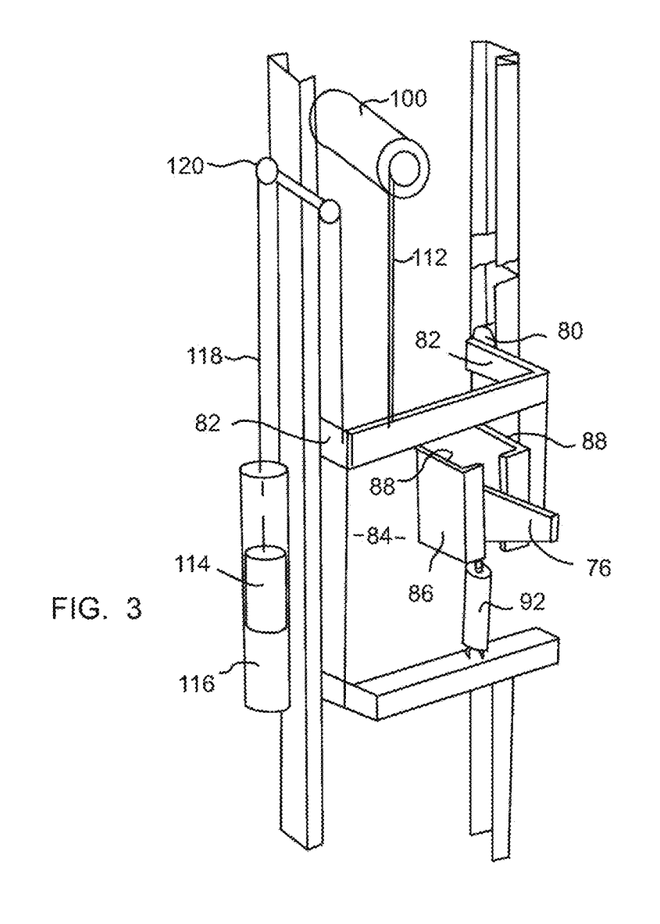
FIG. 3 is an enlarged perspective view of a portion of the apparatus shown in FIG. 2.
Figure 4:
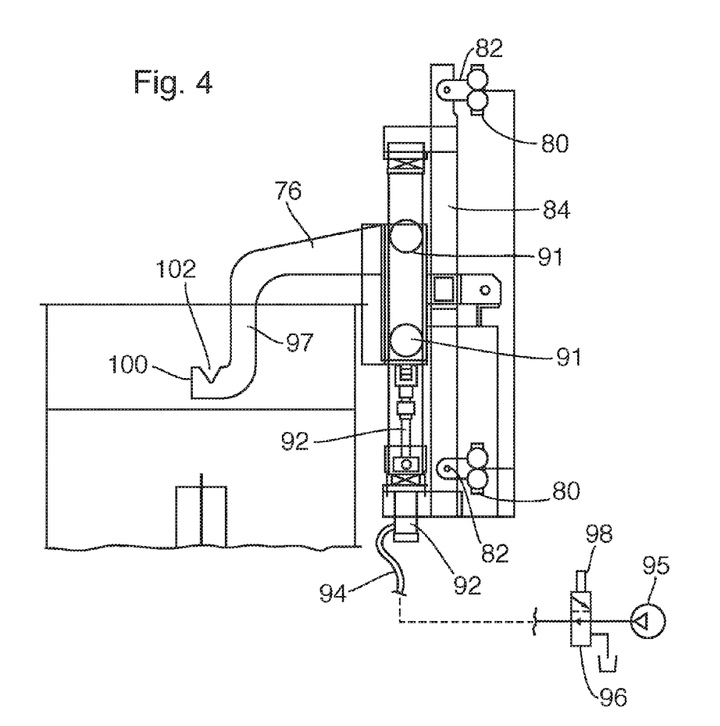
FIG. 4 is a view on the line IV-IV of FIG. 3.
Figure 5:
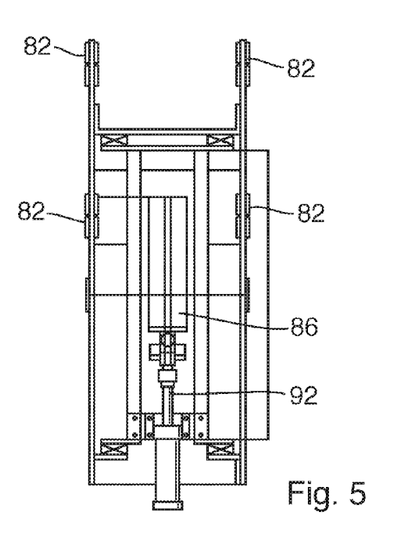
FIG. 5 is a front view of the apparatus shown in FIG. 4.
Figure 6:
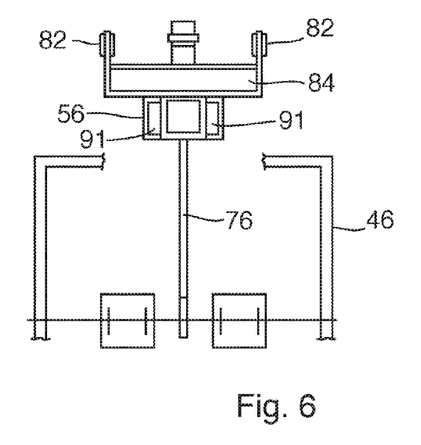
FIG. 6 is a top view of the apparatus shown in FIG. 4.

The secondary lateral conveyor 44 can best be seen in FIG. 2 and comprises a pair of support rails 60 that extend between the transfer station 42 and the curing station 52. The support rails 60 carry a pair of tracks 62 on rollers 64 so that the tracks 62 can move along the rails 60 in unison as indicated by arrow A. A platform 66 is mounted on the track 62 through rollers 68 that allow the platform 66 to move along the axis of the tracks 62 as indicated by arrow B. The combination of the rails 60 and track 62 allow the platform 66 to move along orthogonal axes for positioning relative to the various stations involved in the processing of the component.

A mast 70 is rotatably coupled to the platform 66 and comprises a pair of spaced columns 72 that have a channel cross section. The mast 70 supports a carriage assembly 74 for movement along the axis of the columns 72 as indicated by the arrow C. The carriage assembly 74 has a hook 76 that has a distal end arranged to engage the aperture 26 in the hanger 22.

Referring to the mast 70 in more detail in FIGS. 3 to 6, the columns 72 provide guides for wheels 80. The wheels 80 are rotatably supported upon arms 82 disposed at opposite sides of a base plate 84. A housing 86 is secured to the base plate 84 and has a pair of oppositely directed guides 88 disposed parallel to the channels 72. The hook assembly 76 is slidably mounted within the guides 88 by wheels 91.

An air cylinder 92 is connected between the hook assembly 76 and the base plate 84 and may extend and retract along an axis parallel to the guides 88. A hose 94 supplies pressurised air to the cylinder 92. The hose 94 is connected to a compressor 95 through a valve 96 that can open and close repeatedly through solenoid 98.

Hook 76 extends perpendicular to the base plate 84 and has a downwardly depending body 97 that terminates with an outwardly extending foot 100. A notch 102 is formed on the upper surface of the foot 100 for engagement with the aperture 26 in the bracket 22.

A hoist 110 is located at the upper end of the mast 70 and is operable to raise or lower the carriage 74 through a chain 112. To reduce the load on the chain 112, the carriage 74 is counter balanced by a mass 114 that slides within a tube 116 secured to the outside of one of the channels 72. A cable 118 is connected between the mast 114 and the base plate 84 by entrainment about a pulley 120. The mass 114 is chosen to be slightly less than the mass of the carriage 74 so that a tension is maintained in the chain 112.

The secondary lateral conveyor 44 is used to transfer the components 10 to the fluidized bed 46. This is performed by engaging the notch 100 within the window 26 of the bracket 22 and operating the hoist to lift the bracket off the primary conveyor 20. The mast 70 is then moved laterally causing the tracks 62 to move along the rails 60 until the component 10 is aligned with the opening in the fluidized bed 46. The mast 70 is then advanced along the tracks 62 to position the component over the fluidized bed. The carriage assembly 74 may then be lowered allowing the component 10 to become submerged in the fluidized bed of coating material.

To facilitate the uniform and through coating of the component, the actuator 92 is pulsed to oscillate the component 10 along a vertical axis within the fluidized bed and promote the uniform distribution of the coating material over the exterior surface of the component 10. The pulsing of the component 10 provides a cyclic bodily translation of the component within the fluidized bed that distributes the powder of the fluidized bed within the channel and at the same time prevents bridging the powder around the channel. An abrupt change of direction, or deceleration is preferred, that may be effected through the control of the solenoid 98. It has been found that a pulse rate of between 5 pulses per second and 0.5 pulses per second has provided satisfactory results. A pulse rate in the order of 2 pulses per second is preferred. In one embodiment, the component 10 is a door nominally 66" high by 26" wide that weighs in the order of 100 lbs. Vertical amplitude of between 1" and 4" has been attained.

After a designated time, typically in the order of 3 to 5 seconds, the component is lifted from the bed 46 and the mast 70 moved rearwardly along the track 62 away from the bed. Thereafter the surplus material can be removed from the component 10 at the station 45 and the component returned to the primary conveyor 20 where it can be reattached to the primary conveyor 20 and the hook assembly 76 released.

With certain coatings, the flow of the coating over the surface of the component 10 can be promoted by vibrating the bracket 26 or hook assembly 76, which is transmitted in to the component. This is complementary to the translation of the component by the cylinder 92.

Figure 7:
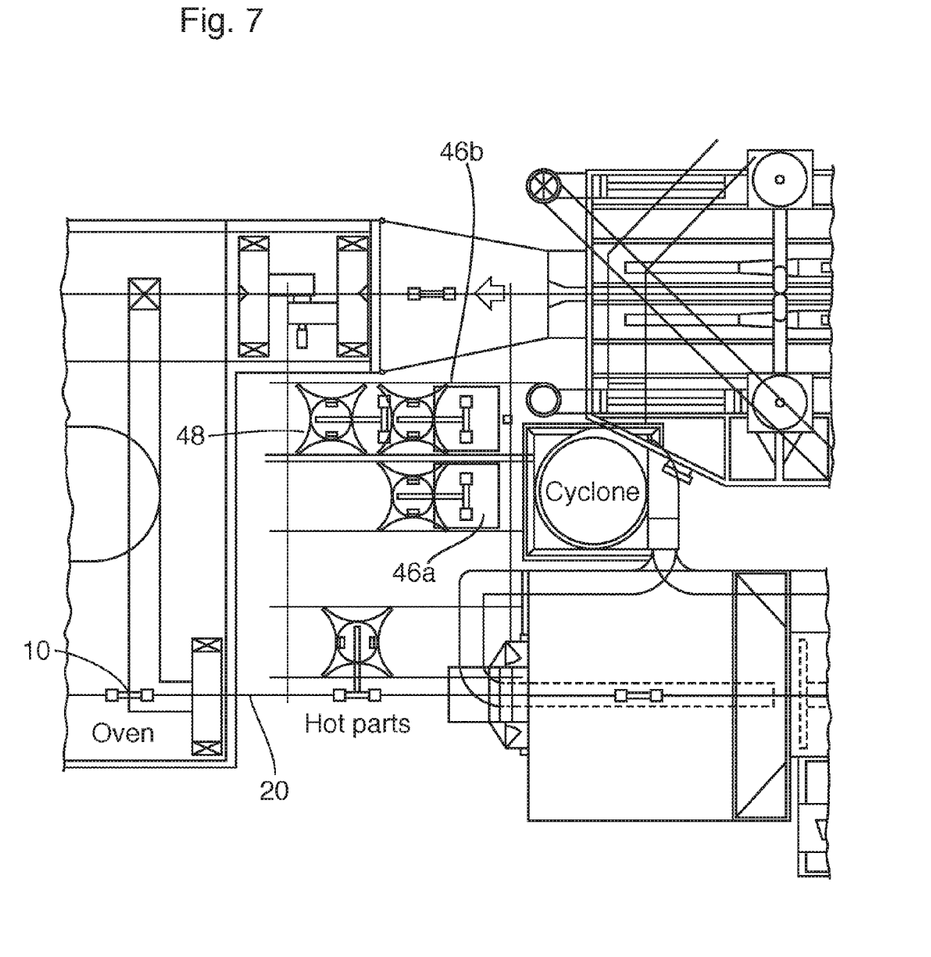
FIG. 7 is a view similar to FIG. 1 of an alternative process.

In an alternative process as shown in FIG. 7, a pair of fluidized beds 46(a), 46(b) are arranged side by side. Each bed 46(a)(b) has a separate coating component and the component may be initially immersed in the first bed, removed and transferred to the second bed through the operation of the tracks 62 and the rails 60 where the component 10 is again immersed. Thereafter, the component 10 can be positioned at the air blow off station 48 and returned to the primary conveyor 20 for curing. In this arrangement, electrostatic coating is not performed but rather a double coating is applied to the component. Oscillation of the component through cylinder 92 may be performed at only the first step or at each step.

After curing, the component may be removed from the primary conveyor 20 and the contact points with the hooks covered with coating material. It will however be noted that the contact points are on an upper edge of the surface of the component such that they would not be subjected to the same corrosive environment as on the lower edges where water may accumulate.

It has been found in practice that the provision of dipping of the component within the fluidized bed or beds enables a thorough coating to be provided on the retainer 18 and to ensure that all surfaces are coated to inhibit corrosion. The oscillation of the component whilst immersed inhibits bridging of the coating with the intricated configuration of the retainer 18 to ensure the surface is coated.

The hook assembly is mounted for movement independent of the mast, allowing the mast to perform the necessary translation and position with the hook providing the oscillation. Other forms of oscillation can be utilised, such as a mechanical cam drive or hydraulic drive. The frequency of oscillation and the vertical excursion will vary according to the component being coated. The oscillation should be of sufficient amplitude and frequency to inhibit bridging of the powder coating without removal of the component from the fluidized bed. Abrupt changes of direction are also preferred at the limits of the vertical movement.

Figure 10:
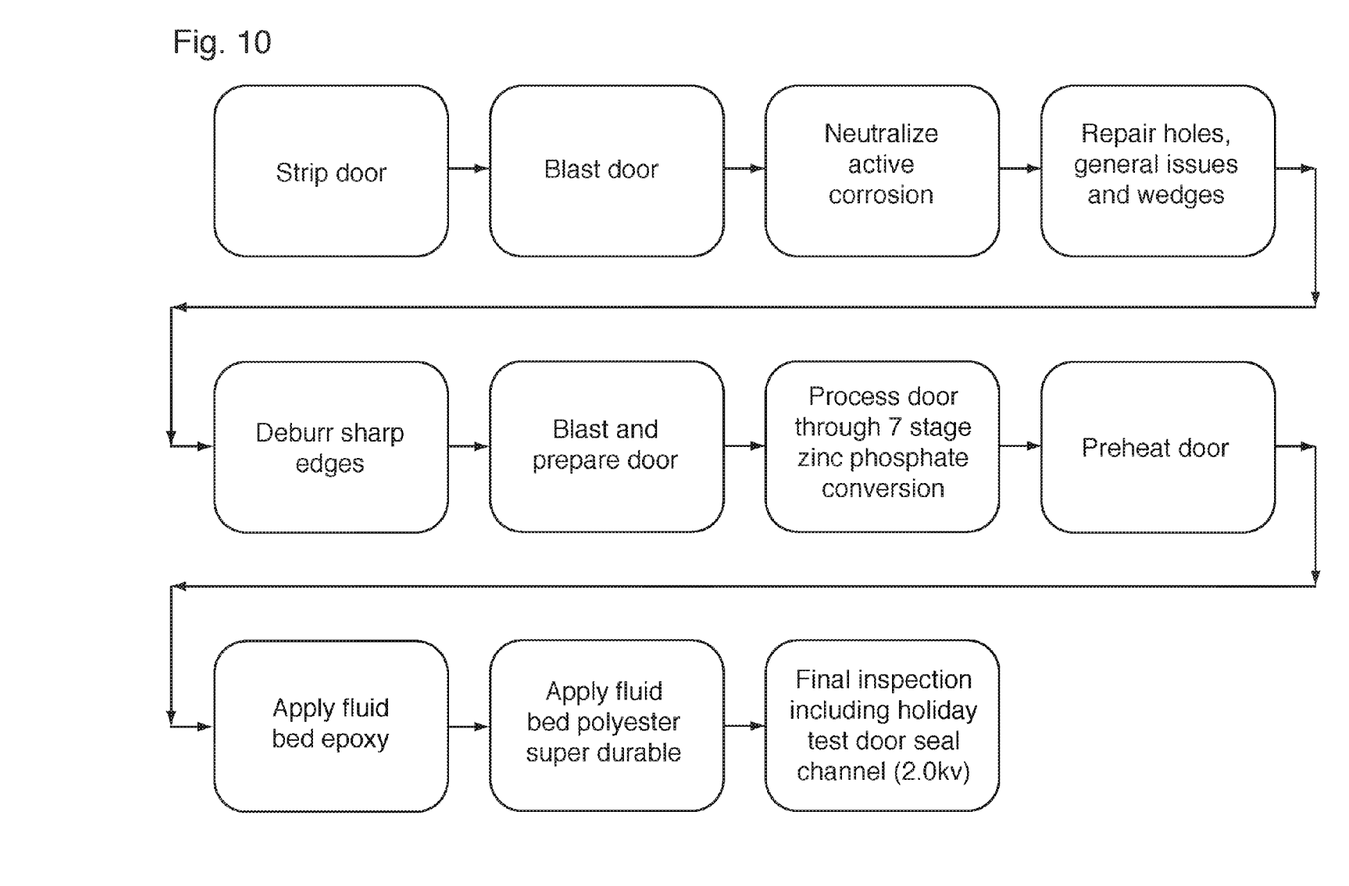
FIG. 10 is a flow chart showing a sequence of steps performed in reconditioning a component.

The process of refurbishing a door that has been subject to corrosion is shown in FIG. 10. Initially the door is stripped of all mechanical components and the surface of the door blasted to remove corrosion. The door is immersed in a neutralising agent to deactivate the corrosion and holes and other defects are repaired.

All sharp edges are then deburred to ensure there are no edges that would prevent proper coating. The door is then blasted to remove contaminants and phosphated to provide a base coat. The door is then passed in to the oven 40 to be heated in preparation for immersion in the fluid bed 46. The first coating of epoxy is applied in the first bed, using the actuator 92 to agitate the door within the bed and ensure full encapsulation. The door is transferred to the second bed 46b where it is immersed in a polyester coating that offers high durability. After coating and curing the door is inspected and tested for fit, including the dimensions of the seal channel.

The primary coating applied in the fluid bed is preferably a fusion bond powder epoxy, such as grey zinc rich epoxy powder. The zinc content of the epoxy is preferably around sixty to-seventy percent by weight, which provides for resistance to undercreepage of the coating layer in corrosive environments. The presence of zinc in the coating also acts as a sacrificial element during the corrosion process. The secondary coating applied in the fluid bed 46b is a solid colour UV protectant layer for the zinc epoxy, such as Protec Z series polyester sold by Protec Chemicals, Montreal Canada. Other suitable coating mediums may be used in fluidized beds such as nylon, PVCS, polyolefins, and polyurethane.

Figure 11:
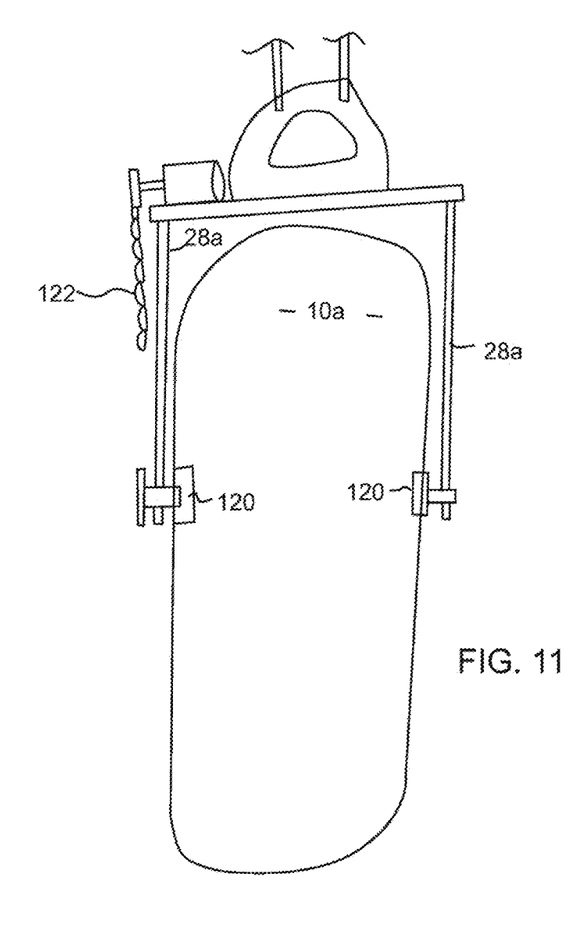
FIG. 11 is a view similar to FIG. 8 of another embodiment.

A further embodiment is shown in FIG. 11 in which movement of the door within the bed is used to inhibit bridging of the coating. In the embodiment of FIG. 10, like reference numerals are used to denote like components with a suffix "a" added for clarity.

The bracket 22a has a pair of arms 28a that extend to either side of the door 10a. The arms 28a clamp to the midpoint of the door 10a through clamps 120 that can rotate relative to the arms 28a. A chain drive 122 is provided for one of the clamps 120 so that the door 10a can be rotated about a horizontal axis when immersed. The rotation may be continuous in one direction, may rotate a number of revolutions in one direction and the reverse, or may oscillate over partial revolutions. The bodily movement of the door 10a within the fluidized bed is sufficient to inhibit bridging of the powder coating and thereby ensure a cohesive coating of the door 10a.

What is claimed is:

1. A method of applying a coating to a component comprising the steps of moving said component along a primary conveyor to a coating station including a fluid bed, transferring said component from said primary conveyor to a hook assembly of a mast assembly movably supported on a secondary conveyor extending from said primary conveyor to said fluid bed, moving said mast assembly along said secondary conveyor and rotating said hook assembly and thereby said component about a vertical axis relative to said secondary conveyor to orient and position said component over said fluid bed, displacing said hook assembly vertically along said mast assembly to lower said component in to said fluid bed to apply said coating thereto, utilising a drive operable upon the component to move said component within said fluid bed to displace said component vertically relative to said secondary conveyor, operating said drive to reverse periodically the direction of movement of said component to produce cyclic bodily translation of said component in a vertical direction within said fluid bed during application of said coating, operating said mast assembly to move said hook assembly vertically to lift said component and remove the component from said fluid bed, moving said mast assembly along said secondary conveyor and rotating said component about a vertical axis to move said component away from said fluid bed and toward said primary conveyor and depositing said component on to said primary conveyor.

2. The method of claim 1 wherein said mast is moved along said secondary conveyor to position said component over a second fluid bed prior to transfer to said primary conveyor.

3. The method of claim 2 wherein said component is lowered by said mast assembly in to said second fluid bed.

4. The method of claim 1 wherein surplus material is removed from said component whilst supported on said secondary conveyor.

5. The method of claim 1 wherein said secondary conveyor provides movement along orthogonal horizontal axes and movement of said mast assembly includes translation of said mast assembly along at least one of said axes from said primary conveyor to said fluid bed.

6. The method of claim 1 wherein said component and said cyclic bodily translation within said fluid bed is provided by applying pulses to said hook assembly.

7. The method of claim 1 wherein application of said pulses produces an abrupt change of direction of movement relative to said secondary conveyor.

8. The method of claim 7 wherein said cyclic bodily translation has a period of between 5 cycles per second and 0.5 cycles per second.

9. The method of claim 8 wherein said cyclic bodily translation has a period of 2 cycles per second.

10. A coating apparatus to apply a coating to a component, said coating apparatus including a primary conveyor to convey said component to a coating station including a fluid bed, a secondary conveyor extending from said primary conveyor to said fluid bed, a mast assembly movably supported on said secondary conveyor and moveable along said secondary conveyor between said primary conveyor and said fluid bed, said mast assembly including a hook assembly to engage and support said component, said hook assembly being rotatable relative to said secondary conveyor to rotate said component about a vertical axis to orient and position said component over said fluid bed, said hook assembly being vertically displaceable along said mast assembly to lower said component in to said fluid bed to apply said coating thereto and to raise said component from said fluid bed, and a drive operable upon the component to move said component within said fluid bed and displace said component vertically relative to said secondary conveyor, said drive periodically reversing the direction of movement of said component to produce cyclic bodily translation of said component in a vertical direction within said fluid bed during application of said coating.

11. The coating apparatus of claim 10 wherein said secondary conveyor is configured to provide movement along orthogonal horizontal axes and movement of said mast assembly includes translation of said mast assembly along at least one of said axes from said primary conveyor to said fluid bed.

12. The coating apparatus of claim 11 wherein said secondary conveyor includes a first pair of rails extending along one of said axes and a second pair of rails extending along another of said axes orthogonal to said first pair of rails and supported on said first pair, said mast assembly being supported on said second pair of rails and moveable relative thereto along said other axis.

13. The coating apparatus according to claim 12 wherein said mast assembly includes a platform extending between said second rails and moveably supported thereon and a mast depending from said platform.

14. The coating apparatus according to claim 13 wherein said mast assembly includes a carriage assembly mounted on said mast and displaceable vertically along said mast.

15. The coating apparatus according to claim 14 wherein said carriage assembly includes said hook assembly.

16. The coating apparatus according to claim 15 wherein said hook assembly is moveable independently of said carriage assembly to impart said cyclic bodily translation to a component carried by said hook assembly.

17. The coating apparatus of claim 16 wherein said drive acts between said hook assembly and said carriage assembly.

18. The coating apparatus of claim 10 wherein said coating station includes a plurality of fluid beds and said secondary conveyor is operable to permit movement of said mast assembly between said fluid beds.

19. The coating apparatus of claim 18 wherein said coating station includes a pair of fluid beds and said secondary conveyor provides for movement of said mast assembly along a pair of orthogonal axes, said fluid beds being disposed side by side along one of said axes.

* * * * *